United States Patent [19]

Whittenberger et al.

[11] Patent Number: 4,916,001

[45] Date of Patent: Apr. 10, 1990

[54] UNITIZED CATALYST PANEL

[75] Inventors: William A. Whittenberger, Garrettsville, Ohio; Steven S. Edson, Elkridge, Md.

[73] Assignee: W.R. Grace & Co.-Conn., New York, N.Y.

[21] Appl. No.: 197,993

[22] Filed: May 24, 1988

[51] Int. Cl.$^4$ .............................................. K32B 3/12
[52] U.S. Cl. .................................... 428/116; 428/593; 502/432
[58] Field of Search .................. 428/116, 182, 593; 502/439

[56] References Cited

U.S. PATENT DOCUMENTS

| | | | |
|---|---|---|---|
| 2,778,458 | 1/1957 | Briggs | 184/34 |
| 4,280,926 | 7/1981 | Abe et al. | 252/430 |
| 4,711,009 | 12/1987 | Cornelison et al. | 29/157 |

Primary Examiner—Joseph L. Schofer
Assistant Examiner—John J. Guarriello
Attorney, Agent, or Firm—Edward J. Cabic

[57] ABSTRACT

There is provided a relatively large unitized monolithic catalyst panel especially adapted for use in the exhaust lines or conduits of stationary power plants to remove pollutants from the exhaust, especially those using hydrocarbon fuels as a source of power. The panels are characterized by top, bottom and side frame plates in rectangular relation, front and rear stiffener bars extending between the top and bottom plates, separator plates at intervals and in parallel relation extending between the side frame plates to define a grid, and corrugated thin metal foil layers disposed within and filling the spaces within the frame, which foil has a catalytically active surface formed thereon. These devices are useful in removing such pollutants as $NO_x$ from exhaust gas streams.

17 Claims, 3 Drawing Sheets

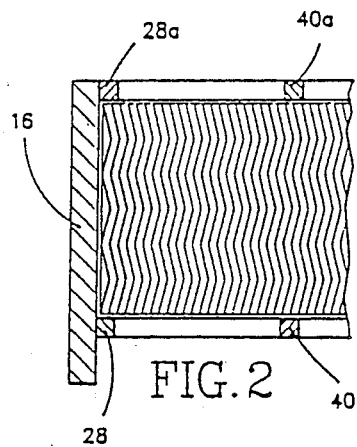
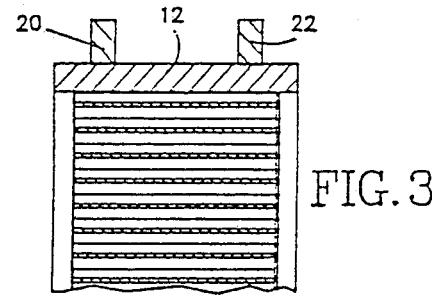
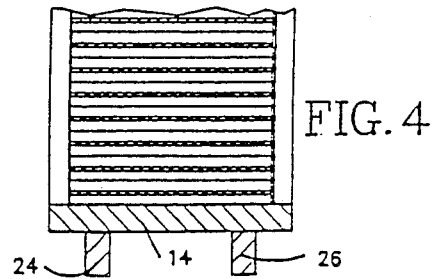

UNITIZED CATALYST PANEL

This invention relates to relatively large unitized catalyst panels especially adapted for use in the exhaust lines or conduits of stationary power plants. More particularly, this invention relates to a construction for such large unitized panels, which panels are useful for the removal of pollutants from the exhaust of power plants, especially those utilizing hydrocarbon fuels as a source of power.

BACKGROUND OF THE INVENTION AND PRIOR ART

Power plants, co-generation plants and other large industrial power generators typically have one or more "curtainwall" type catalytic converters mounted in the exhaust stream conduit. Usually, these converters promote the conversion of carbon monoxide, unburned hydrocarbons, and nitrogen oxides ($NO_x$) into environmentally acceptable substances.

Typically, the converters are made of ceramic or metallic honeycomb material in which the surfaces exposed to the exhaust gas has been treated with a catalytic material to promote the desired conversion. The honeycombs are generally encased in a metal frame approximately two feet on a side and called "modules". A plurality of these modules are then seal welded together to form large panels (generally about 10 feet on a side), which panels are in turn fastened and sealed into a suitable frame for mounting in the exhaust conduit. A typical exhaust conduit might contain one to ten panels each of which contains 20 to 30 modules.

Because the large panels must match up and seal against their corresponding frames in the exhaust conduit, they must be dimensionally correct. Although module dimensions are irrelevant to the function of the finished product, this necessitates that the modules each have unusually tight dimensional specifications to avoid dimensional stack-up problems.

Also, the modules must be seal welded together to form the final panel, which is an expensive and labor intensive process.

This invention provides a manner of constructing a unitized panel to replace the built-up module type panels are up to 10 or more feet on side. The cost of manufacturing many modules each with tight tolerances, and seal-welding them together, is avoided. Less structural material is required in the panel allowing more catalyst to be exposed to the exhaust gas and reducing pressure drop through the unit. Project lead time is greatly reduced and labor costs are less. There is provided a panel construction characterized by a corrugated metal foil catalyst support along with metallic framing and support structures, said metal desirably being stainless steel.

BRIEF STATEMENT OF THE INVENTION

Briefly stated, the present invention is in a rectangular unitized monolithic honeycomb catalyst panel comprising parallel top and bottom frame plates, and parallel side frame plates orthogonally related thereto. A plurality of stiffener bars is provided at spaced intervals, preferably uniformly spaced intervals, extending between the top and bottom frame plates from both the front and rear marginal edges of said top and bottom frame plates. Parallel stop bars are provided against the inside surfaces of each of said side plates and extending between said top and bottom frame plates. A plurality of separator plates in parallel spaced relation and extending between the side plates is also provided. These are preferably notched to accept the front and rear stop bars and the front and rear stiffener bars. This assembly defines a grid of rectangles, desirably uniformly sized, and preferably, albeit not essentially, square rectangles. The spaces between successive separator plates, and the spaces between the uppermost and lowermost separator plates and the adjacent top and bottom frame plates, respectively, are filled with nonnesting corrugated catalyst supporting metal foil laminations. These laminations may be created by layering one course of corrugated foil upon the preceeding course, as in accordion folding, or by placing percut strips equal in length to the distance between the side plates one on top of the preceeding with the same surfaces of the strip in contact.

BRIEF DESCRIPTION OF THE DRAWINGS

The invention may be better understood by having reference to the annexed drawings illustrating a preferred form of the invention and wherein:

FIG. 2 is a cross-sectional view on an enlarged scale showing the portion as it appears in the plane indicated by the line 2—2 in FIG. 1.

FIG. 3 is a cross-sectional view on an enlarged scale showing the section as it appears in the plane indicated by the line 3—3 in FIG. 1.

FIG. 4 is a cross-sectional view on an enlarged scale showing a portion as it appears in the plane indicated by the line 4—4 in FIG. 1.

DETAILED DESCRIPTION OF THE INVENTION

Figure 1:
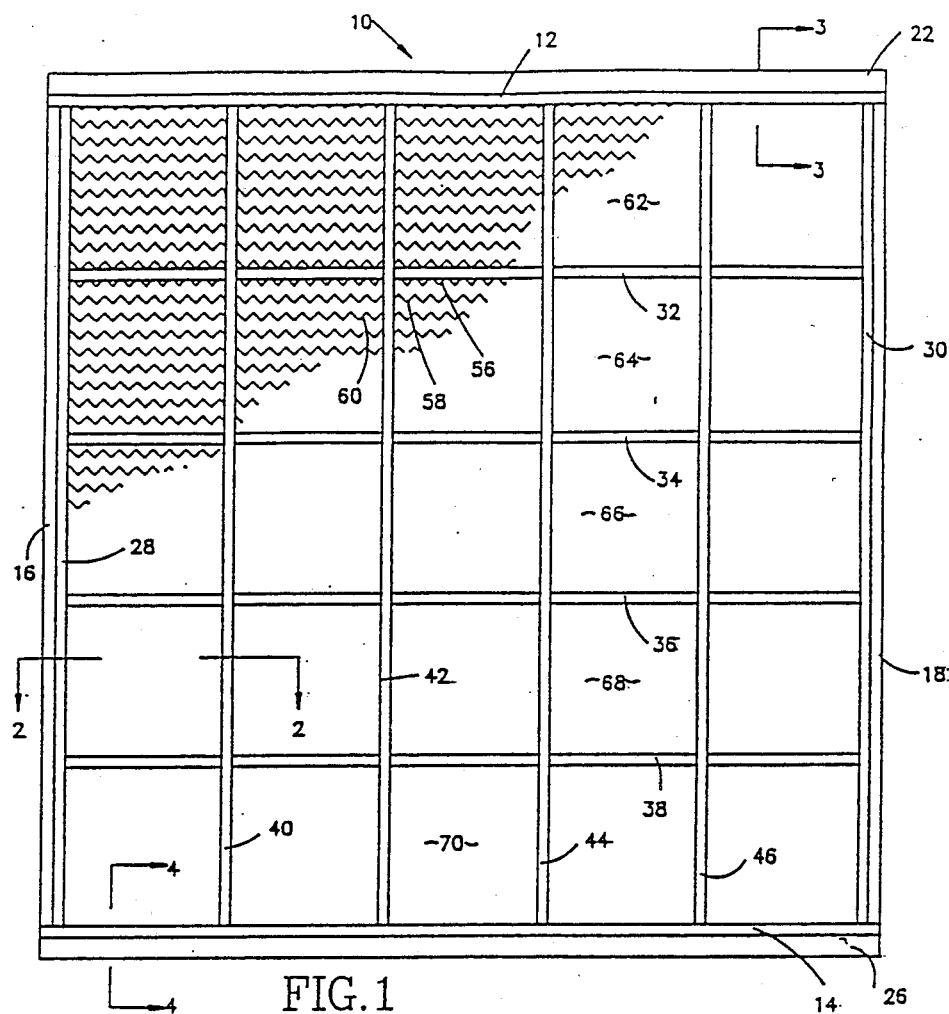
FIG. 1 is a front elevation of a unitized catalyst panel in accordance with the present invention and showing in a partial section the substantially nonnesting corrugated thin metal foil.

Referring now, more particularly, to FIG. 1, there is shown a catalyst panel, generally indicated by the number 10, in accordance with the present invention. The panel 10 is a rectangle, preferably a square, having a top plate 12 and a bottom plate 14, and side plates 16 and 18, respectively, defining the perimeter of the panel. Stiffening ribs 20 and 22 are provided and welded, or otherwise secured, to the top plate 12. In like manner, the bottom plate 14 is provided with stiffening ribs 24 and 26. Although two longitudinally extending and parallel stiffening ribs 20 and 22, for example are shown, any suitable stiffening means may be employed such as a thicker top plate 12, or a single stiffening rib may be used.

The side plates in FIG. 1 are each provided with vertically extending stop bars, such as stop bars 28 and 28a as shown in FIG. 2 secured thereto by an suitable means, e.g., welding. In FIG. 1, stop bar 30 is shown against side plate 18. Although dual stops, e.g., 28, 28a, and 30 and the hidden mate thereto (not shown) are preferred, single stop bars may be used extending along the median line of the side plates 16 and 18 (FIG. 1).

Extending in vertical parallel arrays, front and back, between the top plate 12 and the bottom plate 14 is a series of stiffener boars 40, 40a (not shown in FIG. 1) 42, 42a (not shown in FIG. 1) 44, 44a (not shown in FIG. 1) and 46, 46a (not shown in FIG. 1). FIG. 2 shown the front and rear stiffener bars 40 and 40a.

Figure 5:
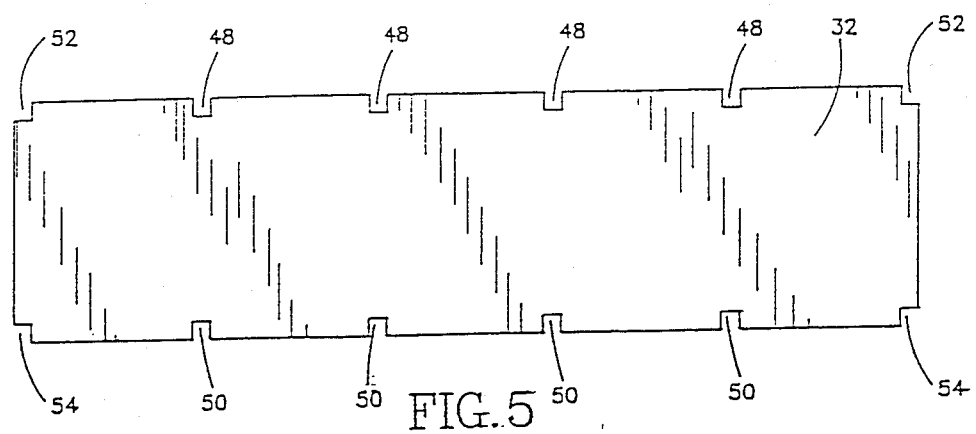
FIG. 5 is a top plan view of a separator plate shown in edge view in FIG. 1.

Extending in horizontal parallel array between the side plates 16 and 18 is a eries of separator plates 32, 34, 36, and 38. The details of the separator plates which are in a preferred embodiment of this invention are best shown in FIG. 5. FIG. 5 shows the details of separator plate 32 having rear stiffener bar notches 48 and front stiffener bar notches 50 adapted and dimensioned to accommodate the rear stiffener bars 40a (FIG. 2), 42a, 44a, and 46a, and front stiffner bars 40, 42, 44, 46 (FIG. 1). The separator plate 32 also has corner notches 52 and 54, front and back, adapted and dimensioned to accommodate the stop bars, for example, stop bars 28 and 28a, (FIG. 2.).

The combination of the top and bottom plates 12 and 14, the side plates 16 and 18, the separator plates 32, 34, 36 and 38, the front and rear stiffener bars 40, 40a, 42, 42a, 44, 44a, 46, and 46a define 25 squares in the form of a square grid. The horizontal rectangles, such as those defined by the top plate 12 and the separator plate 32, are then filled with substantially nonnesting corrugated thin metal foil layers, such as foil layers 56, 58, and 60 partially shown in FIG. 1, extending from side plate 16 and side plate 18. Each of the horizontal rectangles 62, 64, 66, 68, and 70 (FIG. 1) are so filled with the corrugated thin metal foil layers. These layers may be formed by accordion folding a single strip of corrugated thin metal foil, or by layering strips of corrugated thin metal foil one on top of the other in a manner such that contiguous layers do not nest together substantially, and thus cut down on open area. In accordion folding, the top surface of one layer contacts the same top surface of the next layer, the "top surface" being the surface on top as the thin metal strip passed through the corrugating gears. The same arrangement of contacting surfaces is provided in the case of layering individual strips in which case successive layers are flipped over before assembly into the panel. Reference may be had to U.S. Pat. No. 4,711,009 for the details of apparatus and the method of forming a strip of corrugated thin metal e.g., 0.001 to 0.003 inch thick aluminum coated stainless steel foil. The disclosure of the foregoing U.S. Patent is incorporated herein by reference thereto.

Figure 6:
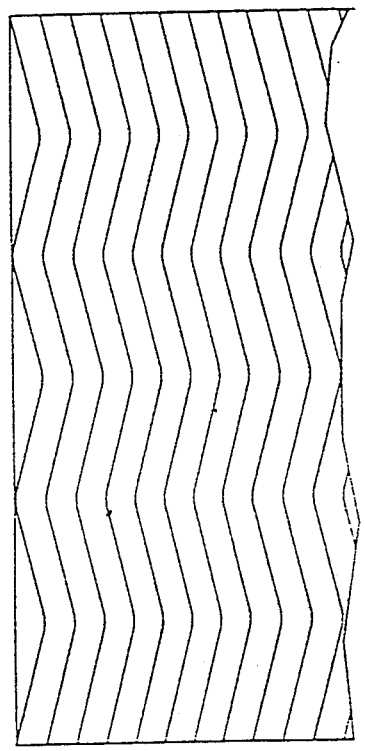
FIG. 6 is a diagrammatic illustration of a series of peaks and valleys of a substantially nonnesting catalytic foil support, and illustrating a modified chevron pattern.

According to that patent, a chevron pattern corrugation is formed, although a pattern wherein the apices of the chevrons are rounded off (to provide a modified chevron pattern, such as better shown in FIG. 6) is preferred to stress relieve the foil at these points. After passing the foil through the corrugating gears, it is stress relieved with heat, and then given one or more wash coats of aluminum oxide, or zirconium oxide and baked. This provides a porous surface in which a catalyst may be deposited as provided in said patent. The catalyst is desirably palladium, or palladium/rhodium, or vanadium pentoxide or any other catalyst or combination thereof useful in removing pollutants from exhaust gas streams. Such chevron or modified chevron patterns will not nest if accordion folded or layered by reversing successive layers as above described. Moreover, the modified chevron pattern (FIG. 6) affords good mixing of the gases, or mixing of the exhaust gas with a reacting gas, e.g., ammonia, as in a selective catalytic reduction unit, or SCR, within the panel.

In fabricating the panels of this invention, the frame plates 12, 14, 16 and 18 with stiffening ribs 20, 22, 24, and 26 and stop bars 28, 28a, 30 and 30a (not shown) attached are welded together to form the perimeter of the panel 10. The frame plates in conjunction with the stiffening ribs and stop bars are designed with such a cross-section as to make the completed panel stiff enough to maintain its shape during fabrication and handling, and when in the exhaust stream.

Rear stop bars 28a and 30a (not shown) are attached to the frame plates before the catalytic foil is installed in the panel 10.

Rear stiffener bars 40a, 42a, 44a and 46a, oriented vertically on about 2 foot centers horizontally, are welded to the top and bottom frame plates 12 and 14 before the catalytic foil is installed in the panel 10. Horizontal spacing of the stiffner bars is designed so that there will not be a structural failure of the catalyst foil under operating conditions when the panel 10 is the exhaust stream. Front stiffener bars 40, 42, 44, and 46 are installed after the foil is installed in the panel 10. The various stop bars are designed with such a cross-section as to maintain frame stiffness in handling and in use, as well as to accommodate the difference in thermal expansion between the frame and the catalyst foil. This precaution ensures that the foil ends are retained under all conditions of thermal expansion.

Catalytic metal foil material, cut into lengths of approximately 10 feet, and laid up horizontally so as to fill the opening formed by the top and bottom frame plates 12 and 14, or the rectangular sections 62, 64, 66, 68, and 70, respectively. This can be layers of foil strips with chevron or modified chevron as shown in FIG. 6, with every other layer reversed so that adjacent layers do not nest one within the next. Alternatively, the catalyst foil pack may be alternate layers of flat and corrugated foil material. Also, the catalyst pack can be a continuous strip of catalytic foil with chevron corrugations or modified chevron corrugations, in accordion or zig-zag folded form, each layer being about 10 feet long from fold line to fold line.

Instead of a chevron or modified chevron pattern, a pattern of straight corrugations across the foil, but at an angle oblique (e.g. 80° to the edge) to the marginal edges of the foil may be used. The latter is layered in the same manner as described above for the chevron or the modified chevron patterns. Alternatively, corrugations may be in a straight line across the foil normal to the longitudinal marginal edges of the foil and wherein successive corrugations peaks have a variable pitch.

Reference may be had to Ser. No. 198,042, filled May 24, 1988, now U.S. Pat. No. 4,810,588 filed concurrently herewith entitled "Nonnesting, Straight Corrugation Metal Foil and Method for Making Same" on which the inventors are Wesley A. Bullock and William W. Whittenberger, for the details of variable pitch corrugations.

Separator plates (FIG. 5) are layered horizontally into the frame opening with the catalytic foil at intervals of about 2 feet vertically. As previously indicated, the separator plates 32, 34, 36, and 38 have notches 48 and 52, and corner notches 52 and 54 (FIG. 5) that match up with the locations of the front and rear stop bars and the front and rear stiffener bars. Separator plates 32, 34, 36, and 38 are simply laid in the frame at the appropriate time when the catalytic foil is being laid in. After all the foil is in place, and all the front stiffener bar are installed, the separator plates are fastened to the front and rear stop bars and the front and rear stiffener bars using a pinning or welding technique. The separator plates 32, 34, 36, and 38 have a designed cross-section so as to resist the tendency of the panel 10 to bend under the pressure of the gas stream. Spacing of the separator plates 32, 34, 36, and 38 is designed such that sagging of tall stacks of catalyst foil due to high temperatures can be avoided.

The foregoing construction technique is applicable to panels, rectangular or square, of sizes in the range of 3 feet on a side up to about 15 feet on a side.

What is claimed is:

1. A rectangular unitized monolithic honeycomb catalyst panel comprising
    parallel top and bottom frame plates, and parallel side frame plates orthogonally related thereto,
    a plurality of parallel stiffener bars at spaced intervals extending between said top and bottom frame plates from both the front and rear marginal edges of said top and bottom frame plates,
    parallel stop bars lying against the inside surface of each of said side plates and extending between said top and bottom frame plates;
    a plurality of parallel notched separator plates extending between said side plates with the front and rear stop bars and stiffener bars occupying said notches whereby a grid of uniformly sized rectangles is defined, and
    a plurality of nonnesting corrugated catalyst supporting metal foil laminations adapted for contacting exhaust gases flowing from the front to the rear of the panel, said metal foil laminations filling
    the spaces between said separator plates, and
    the space between the uppermost separator plate and the adjacent top frame plate and
    the space between the lowermost separator plate and the bottom frame plate.

2. The rectangular unitized monolithic honeycomb catalyst panel as defined in claim 1 further including means for stiffening said top and bottom frame plates.

3. The rectangular unitized monolithic honeycomb catalyst panel as defined in claim 2 wherein the stiffening means include one or more longitudinally extending stiffening ribs secured to said top and bottom frame plates.

4. The rectangular unitized monolithic honeycomb catalyst panel as defined in claim 1 wherein the nonnesting corrugated catalyst supporting metal foil has patterned corrugations which do not result in nesting of contiguous layers when layered.

5. The rectangular unitized monolithic honeycomb catalyst panel as defined in claim 4 wherein the pattern of the patterned corrugations is generally a zig-zag pattern.

6. The rectangular unitized monolithic honeycomb catalyst panel as defined in claim 5 wherein the zig-zag pattern is a chevron pattern, having angular apices.

7. The rectangular unitized monolithic honeycomb catalyst panel as defined in claim 6 wherein the apices of the chevron pattern are rounded to relieve stress.

8. The rectangular unitized monolithic honeycomb catalyst panel as defined in claim 4 wherein the corrugations are in a straight line across the foil oblique to the marginal edges, and successive layers are reversed to avoid nesting.

9. The rectangular unitized monolithic honeycomb catalyst panel as defined in claim 4 wherein the corrugations are in a straight line across the foil normal to the marginal edges and successive corrugations have a variable pitch.

10. The rectangular unitized monolithic honeycomb catalyst panel as defined in claim 1 wherein the catalyst is disposed on an alumina coating applied to the corrugated foil.

11. The rectangular unitized monolithic honeycomb catalyst panel as defined in claim 1 wherein the catalyst is disposed on a coating comprising zirconia applied to the corrugated foil.

12. The rectangular unitized monolithic honeycomb catalyst panel as defined in claim 10 wherein the catalyst comprises palladium.

13. The rectangular unitized monolithic honeycomb catalyst panel as defined in claim 11 wherein the catalyst comprises palladium.

14. The rectangular unitized monolithic honeycomb catalyst panel as defined in claim 10 wherein the catalyst comprises palladium/rhodium.

15. The rectangular unitized monolithic honeycomb catalyst panel as defined in claim 11 wherein the catalyst comprises palladium/rhodium.

16. The rectangular unitized monolithic honeycomb catalyst as defined in claim 10 wherein the catalyst comprises vanadium pentoxide.

17. The rectangular unitized monolithic honeycomb catalyst as defined in claim 11 wherein the catalyst comprises vanadium pentoxide.

* * * * *